US008358199B2

(12) United States Patent
Nesling

(10) Patent No.: US 8,358,199 B2
(45) Date of Patent: Jan. 22, 2013

(54) DELIVERY CONTAINER

(76) Inventor: Andrew Edward Nesling, Bandbury (GB)

( * ) Notice: Subject to any disclaimer, the term of this patent is extended or adjusted under 35 U.S.C. 154(b) by 832 days.

(21) Appl. No.: 12/514,843

(22) PCT Filed: Nov. 14, 2007

(86) PCT No.: PCT/GB2007/050689
§ 371 (c)(1),
(2), (4) Date: Aug. 13, 2009

(87) PCT Pub. No.: WO2008/059290
PCT Pub. Date: May 22, 2008

(65) Prior Publication Data

US 2010/0085148 A1 Apr. 8, 2010

(30) Foreign Application Priority Data

Nov. 16, 2006 (GB) .................................. 0622881.1
Jun. 20, 2007 (GB) .................................. 0711901.9

(51) Int. Cl.
*B60R 25/00* (2006.01)
*G08B 13/14* (2006.01)
*A47G 29/12* (2006.01)
*B65G 11/04* (2006.01)

(52) U.S. Cl. .................... 340/5.73; 340/568.1; 340/569; 232/20; 232/21; 232/45

(58) Field of Classification Search .................. 340/5.73
See application file for complete search history.

(56) References Cited

U.S. PATENT DOCUMENTS 3,935,994 A * 2/1976 Darvishian ..................... 232/36
5,488,660 A * 1/1996 Dawson et al. ............... 713/182
5,519,188 A * 5/1996 Yuichi et al. .................. 219/407
5,624,071 A * 4/1997 Sosan ............................. 232/17
6,300,873 B1 * 10/2001 Kucharczyk et al. ...... 340/568.1
6,375,070 B1 * 4/2002 Snoke ............................. 232/20
6,987,452 B2 * 1/2006 Yang ............................. 340/569
7,256,691 B2 * 8/2007 Awobue ..................... 340/545.6
7,525,429 B2 * 4/2009 Carrigan ....................... 340/569
8,164,452 B2 * 4/2012 Moses et al. .................. 340/569

(Continued)

FOREIGN PATENT DOCUMENTS

EP 1 138 232 10/2001

(Continued)

OTHER PUBLICATIONS

International Search Report dated Feb. 29, 2008, from corresponding PCT application.

*Primary Examiner* — Jennifer Mehmood
*Assistant Examiner* — John Mortell
(74) *Attorney, Agent, or Firm* — Young & Thompson

(57) ABSTRACT

A lockable container (1) for receiving items includes elements for generating a random code when the container is locked, elements for transferring the code to a person locking the container, and a memory for storing the code. The container further includes elements (2) for unlocking the container to a first stage, in which the contents of the container can be viewed by a user but not removed from the container, and elements for transferring the code to the user when the container is unlocked at the first stage. The container can then be unlocked to a second stage (3), in which the user can remove the contents of the container and the code is removed from the memory.

11 Claims, 4 Drawing Sheets

U.S. PATENT DOCUMENTS

2005/0104730 A1 5/2005 Yang

FOREIGN PATENT DOCUMENTS

| | | |
|---|---|---|
| FR | 2 830 960 | 4/2003 |
| GB | 1 234 948 | 6/1971 |
| GB | 2 083 549 | 3/1982 |
| GB | 2 358 428 | 7/2001 |
| GB | 2 365 606 | 2/2002 |
| GB | 2 375 137 | 11/2002 |
| GB | 2 403 509 | 1/2005 |
| GB | 2 430 608 | 4/2007 |

* cited by examiner

| | STAGE 1 (Recipient) | STAGE 2 (Recipient) | STAGE 3 (Carrier) | STAGE 4 (Carrier) | STAGE 5 (Carrier) | STAGE 6 (Carrier) | STAGE 7 (Recipient) | STAGE 8 (Recipient) | STAGE 9 (Recipient) | STAGE 10 (Recipient) | SOLUTION | COMPARED WITH SIGNATURE |
|---|---|---|---|---|---|---|---|---|---|---|---|---|
| 13 | Box is not left on latch or delivery already made | | | | | | | | | | Parcel or letter cannot be delivered. Can be delivered following day or picked up. If a regular occurrence can use more than one box. | SAME or BETTER |
| 14 | | Box is left closed but not locked | Put Parcel or letter in box | Lock box | Record code | Put slip with delivery details and code through letterbox | Check slip with code on box | Check slip with contents of box | Unlock box and remove parcel | Accept delivery | correct sequence. | BETTER |
| 15 | | Box is left closed but not locked | Put Parcel or letter in box | Lock box | Record code | | | | | Do not accept delivery | Look at parcel or letter though window in box and contact supplier to find courier. Do not open box if in any doubt. Can take photo of packet in box as proof. | SAME or BETTER |
| 16 | | Box is left closed but not locked | | Lock box | Record code | Put slip with delivery details and code through letterbox | Check slip with code on box | Check slip with contents of box | | Do not accept delivery | Do not open box. Contact courier, code with empty box is proof that parcel or letter has not been delivered. | BETTER |
| 17 | | | | | Record code | Put slip with delivery details and code through letterbox | Check slip with code on box | | | Do not accept delivery | Not possible without locking box. Code is only displayed for a short time after box is locked. | BETTER |
| 18 | | | | | Record code | | | | | Do not accept delivery | Not possible without locking box. Code is only displayed for a short time after box is locked. | BETTER |
| 19 | | Box is left closed but not locked | | Lock box | Record code | | | | | Do not accept delivery | Photo of empty box with code can be taken for proof later. | SAME or BETTER |
| 20 | | Box is left closed but not locked | | | Make up code | Put slip with delivery details and code through letterbox | Check slip with code on box | Check slip with contents of box | | Do not accept delivery | From code database stored by manufacturer of box it can be proven that code is false. | BETTER |
| 21 | | Box is left closed but not locked | | | Make up code | | | | | Do not accept delivery | If it is later discovered that this has happened then, from code database stored by manufacturer of box it can be proven that code is false. | SAME or BETTER |
| 22 | | Box is left closed but not locked | Put Parcel or letter in box | Lock box | Record code | Put slip with delivery details and code through letterbox | Check slip with code on box | Check slip with contents of box | Unlock box and remove parcel | Do not accept delivery | Delivery company can prove from code that item was delivered. | BETTER |

Figure 5

DELIVERY CONTAINER

TECHNICAL FIELD

The present invention relates to a delivery container.

BACKGROUND

With the increasing use of internet and mail order shopping and the reduction of people who are at home during the working day, the problem of not being able to deliver a parcel or letter first time is increasing. This has a negative impact on the environment, as re-arranging delivery requires more transport of parcels. Also increasing is the number of people buying items directly from other individuals or traders in other countries, where proof of delivery can be very important.

Where a recipient of a delivery is present when a delivery is made, the recipient can check the goods delivered and provide a signature to confirm receipt of the correct goods in a satisfactory condition.

Containers are available which allow a recipient to accept a delivery without being present. GB 2394509 discloses a secure delivery box that has a keypad that requires a security code to be entered before it can be opened. The box can provide proof of delivery in the form of a printed slip or a signal sent from the box. EP1138232 discloses a similar arrangement in which a lockable box displays a delivery code when the box is opened. GB 2358428 discloses a key for opening a secure container that can only be used once to deliver an item. GB 2365606 discloses a storage system that transmits a code to a carrier for gaining access to a delivery box. The code is variable and is generated for each delivery. The carrier uses the code to open the delivery box. GB 2375137 discloses a delivery box having a printer. When a delivery is made and the box closed, the printer generates a code that is used as a proof of delivery notice. GB 1234948 discloses a delivery box that has a window allowing a recipient to view the contents of the box.

A problem with these known devices is that, even though they provide a code or slip that purports to prove delivery, this can be abused by an unscrupulous delivery person. Such a person could deliver incomplete goods, damaged goods, the wrong goods, or no goods at all. The delivery box will still generate a code that shows a delivery was made, and if the recipient does not receive the correct delivery then they would need to show that the delivery company was at fault. Even where there has been a genuine error in the delivery, the recipient must go through time consuming negotiations with the delivery company to ensure that they have received the correct goods. Furthermore, the known devices are susceptible to abuse by an unscrupulous recipient. An unscrupulous recipient could claim that delivery had not been made when, in fact, it had, or report the item as damaged. These solutions trust both the carrier and the recipient, and in some case require additional infrastructure to implement.

There is a need for a secure device that can provide proof of delivery without the recipient of the delivery being present, yet leave the recipient with the advantages of signing for the delivery in person, for example ensuring the package has been delivered and is not damaged before accepting the delivery. Furthermore, the design of the device must be such that the cost to the recipient of installing the device outweighs the inconvenience and cost of having the parcel or letter re-delivered or collecting it from the carrier. Ideally, the device would not require any additional infrastructure on the part of the carrier, as this would increase the cost of delivery. For privacy and security, the solution should provide privacy for the recipient by obscuring the contents of a delivery container, but allow the recipient to view the contents before accepting delivery.

SUMMARY

The inventor has devised a container that, once locked, generates a code as proof of locking. The container is unlocked in two stages; the first stage allows the recipient to view the contents of the container but not to remove them. If the recipient is not satisfied with the delivery, the container can be re-locked at this stage and the code can be used to authenticate that the user has not accepted the delivery. The second stage of unlocking allows the code to be cleared and the recipient to remove the contents of the container, thereby accepting the delivery.

According to a first aspect of the present invention, there is provided a lockable container for receiving items. The container comprises means for generating a random code when an item is placed in the container, and means for transferring the code to a person placing the item in the container. The container further comprises a memory for storing the code. The container comprises means for unlocking the container to a first stage, in which the contents of the container can be viewed by a user but not removed from the container, and means for transferring the code to the user when the container is unlocked at the first stage. The container can then be unlocked to a second stage, in which the user can remove the contents of the container. In the event that the container is unlocked to the second stage, the code is removed from the memory. In this way, if the user unlocks the container to the first stage and is dissatisfied with the delivery (for example, it is missing, incorrect or damaged) the user can obtain the code to use when contacting the deliverer to prove receipt. In this case, the user would not unlock the container to the second stage to remove the item, and the code would remain in the memory of the storage box, thus proving to the deliverer that the user has not unlocked the box to the second stage. This prevents a dishonest user from removing the item and subsequently claiming that it was not delivered at all. If, on the other hand, the user is satisfied with the delivery, he unlocks the container to the second stage in which the item can be removed from the container, and the code is erased from the container memory. Because the code is no longer in the memory, the deliverer can verify that the container has been unlocked to the second stage, indicating the user's acceptance of the delivery.

In one embodiment, the container comprises an opaque outer door which can be locked shut, and a transparent inner door. By opening the outer door, the recipient unlocks the container to the first stage, as they can see the contents of the container through the transparent door. The second stage of unlocking allows the user to open the transparent inner door.

In an alternative embodiment, the container comprises a flexible bag having a drawstring around an opening to the flexible bag. The first stage of unlocking loosens the drawstring sufficiently to allow the user to view the contents of the flexible bag, and the second stage of unlocking further loosens the drawstring to allow the user to remove any contents of the flexible bag.

The random code may be a proof-of-delivery code. The means for transferring the code to a person locking the container may be selected from any of a visual display readable by the user, the visual display arranged to display an alphanumeric code or a bar code; a radio frequency signal; an infra-red signal; and a sound signal, and the transferring means may be active for a predetermined period of time to ensure that the code is not constantly being transferred. The container may also comprise means to re-transfer the code.

The generated code may comprise values selected from a serial number unique to the container; a date stamp; and a time stamp, to ensure that the code is unique to the container and to the time/date of delivery. The code may also be encrypted to ensure that a malicious third party, carrier or recipient can not replicate a code.

The locking means may be selected from one of a lock and key; an electronic keypad; an infrared receiver; a radio frequency receiver; a magnetic card reader; and a sound receiver. The container may further comprise means to activate the locking means.

The container may comprise further means to open the container when it is left waiting for a delivery, for example a lock or button that can be activated by the carrier to open the container. It is preferred that the further means of opening the container when waiting for a delivery cannot be used to unlock the container when a delivery has been made. It is preferred that if the container has not been opened then it can not be locked and a code generated. The additional function is to prevent people other than a carrier from opening the container and closing it maliciously.

The container can be easily adapted for other applications such as the collection of parcels, secure ballot boxes, storage of valuable or dangerous items such as drugs or chemicals, where the contents must be verified before they can be removed and the code cleared.

BRIEF DESCRIPTION OF THE DRAWINGS

For a better understanding of the present invention and in order to show how the same may be carried into effect reference will now be made by way of example to the accompanying drawings in which:

FIG. 5 illustrates possible delivery scenarios; and

DETAILED DESCRIPTION

In the following description the person who is receiving the parcel or letter will be named the recipient. The person or company delivering the parcel or letter will be named the carrier.

Figure 1:
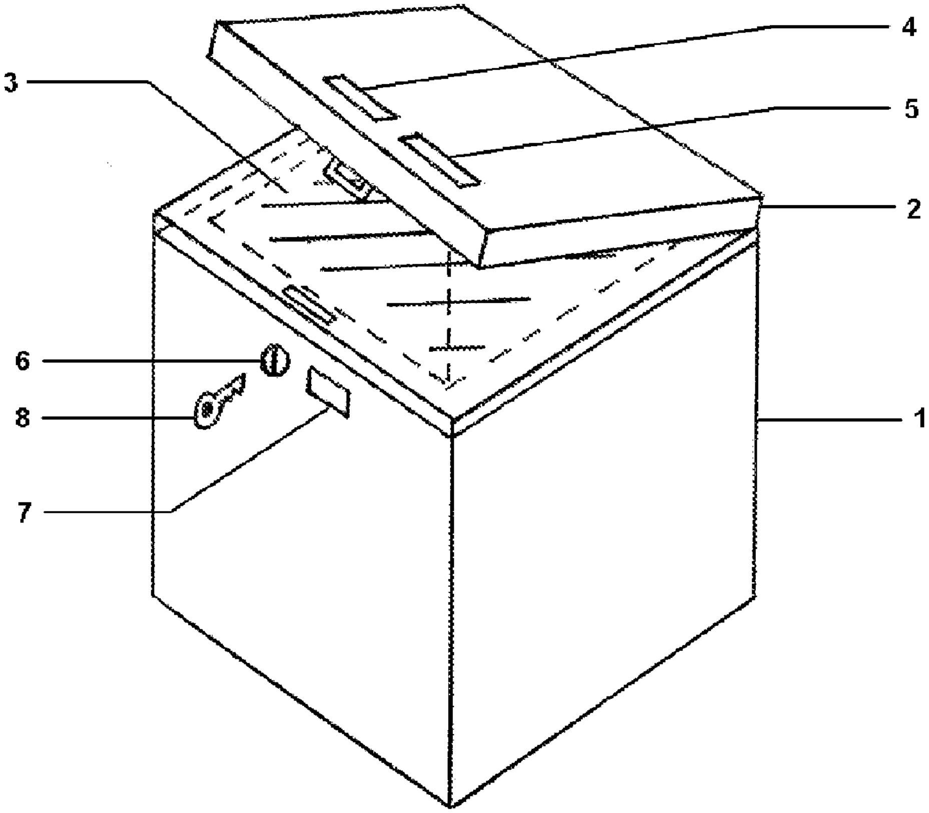
FIG. 1 shows an isometric view of a delivery box according to an embodiment of the invention.

Referring to FIG. 1, there is provided a container 1 having a hinged door 2 that protects and obscures the contents of the container and allows access to an inner door 3. The container 1 has attachment points for attaching the container to a surface such as a wall, a floor or a ground surface. The door 2 and the container 1 are arranged to prevent ingress of moisture or dust, thereby protecting a delivery that is placed into the container.

The inner door 3 of the container is transparent. This allows the recipient to view the contents without being able to gain access to them.

The container 1 further comprises a display 4 for displaying an alphanumeric code. The code is generated by electronics (not shown) that are powered by a battery. A solar collector 5 is provided to maintain a battery charge and/or power the unit. Of course, this may not be necessary if the owner of the container is willing to change batteries or if the electronics is powered by a mains electricity supply.

A lock 6 and a corresponding key 8 are provided to allow the door 2 to be locked thereby closing the container. An opening lock or button 7 may also be provided that can be used to open the container when it is waiting for a delivery, but not to unlock the container once the delivery has been made.

When a recipient is not present at a delivery address, the container 1 is left so that the door 2 is closed but not locked. When a delivery is made, the carrier opens the door 2 and the inner door 3, places the package or letter inside the container 1 and closes the doors 2, 3. The door 2 may automatically lock when it is closed. The use of an opening lock or button 7 makes it less likely that someone other than the carrier could open the door 2 and damage the contents of the container. Once locked closed, the container 1 can be opened by using a key 8 in the lock 6. Only the recipient possesses the key 6.

Figure 2:
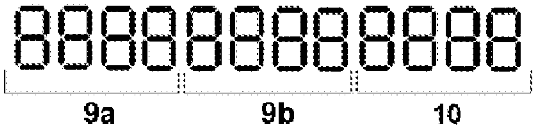
FIG. 2 illustrates schematically a proof-of-delivery code.

When locked closed, the electronics in the container 1 generates an alphanumeric code that is shown on the display 4 to the carrier for a period of time long enough for the code to be recorded as proof of delivery. A switch in the locking mechanism and/or the hinge of the door 2 signals the electronics to generate the code. The code generated is illustrated in FIG. 2, and may be a three part encrypted alpha numeric. The first code part 9*a* is a component of or all of a serial number, which is unique to each container 1, the second code part 9*b* is a generated on the basis of one or all of a time and date, and the third code part 10 is a randomly generated alpha-numeric code. By randomly generated, it is meant that the third code part 10 is random or pseudorandom. Whilst the example code described for FIG. 2 comprises 12 characters, it will be appreciated that the code may be of any required length and form.

Figure 3:
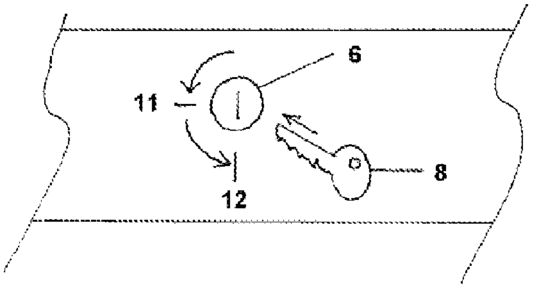
FIG. 3 illustrates schematically a two-stage locking system for the container of FIG. 1.

Once the carrier has recorded the delivery code, the carrier provides the generated code along with a description of the delivery, to the recipient. This information may be provided in the form of a delivery slip put through the letter box of the recipient. On being aware that a delivery has been made, the recipient can check the description of the delivery provided by the carrier with the contents of the container and delivery code provided by the carrier with the code recorded by the container 1 by putting the key 8 into the lock 6 and turning it to an unlock stage 1 position 11, as shown in FIG. 3. With the lock in position 11, the code is displayed to the recipient and they are able to open the door 2 and view the contents through transparent door 3. The electronic circuit inside the container 1 is signalled that the lock has been turned to position 11 by a switch securely inside the locking mechanism and/or by a switch in the hinge of door 2.

At position 11 the container 1 is still closed and the recipient cannot gain access to the inside of the container 1 or its contents. If there is a discrepancy with the description, the code, the contents, visible damage to the contents, or other problems, the carrier can be contacted before the recipient is deemed by the carrier to have accepted the delivery. On turning the key 8 in lock 6 to unlock stage 2 position 12 the container 1 is unlocked, and the recipient can gain access to the delivery and will be deemed by the carrier to have accepted the delivery. The code generated is no longer displayed. When the container 1 is subsequently locked closed a new code is generated as described above.

If multiple deliveries are normally attempted before the recipient could accept them, then the recipient may decide to have more than 1 of the containers described above, or a container that has multiple code generator and compartments for each delivery.

In an alternative embodiment of the invention the container may have a chute into which parcels are placed (similar to a bank night safe). Each time the chute is closed a new delivery code is generated. To remove all the items from the container the same two stage unlocking process is used. The first stage comprises opening an opaque door and displaying all the delivery codes. In the second stage the contents could be viewed through a clear door and if all the deliveries are acceptable, the clear door can then be opened, clearing all the delivery codes. Whilst multiple deliveries could be made before the recipient accepts them, all of the deliveries can be accepted at once, and so all of the deliveries would need to be acceptable before the second stage transparent door is unlocked.

Where the code is encrypted, then the manufacturer of the container 1 holds a copy of the container serial number and the encryption method used for that container. In the event of a dispute as to whether a particular code was generated by a particular container, the manufacturer of the container can verify from the details they hold whether the code was generated by that container.

Figure 4:
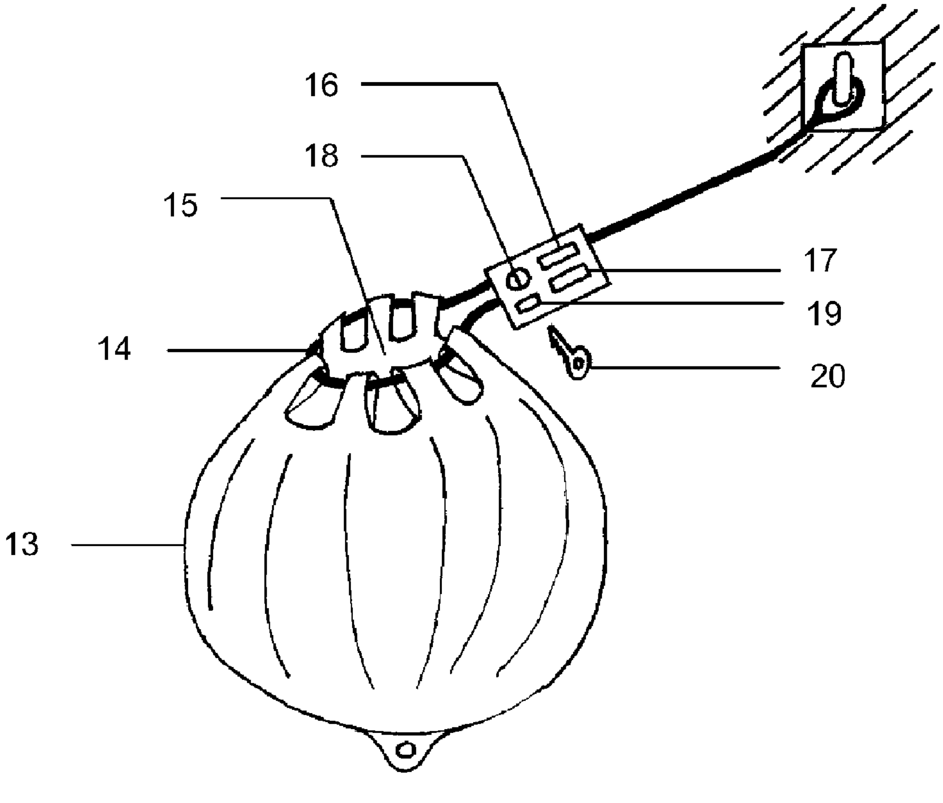
FIG. 4 shows an isometric view of a delivery bag according to a further embodiment of the invention.

In an alternative embodiment of the invention, and referring to FIG. 4, there is provided a flexible container 13. The flexible container 13 is provided with a 'drawstring' 14, which is made from a suitable strong material such as steel rope, that protects and obscures the contents of the container 13. When the drawstring 14 is loosened, it allows the contents of the container 13 to be viewed but not removed through opening 15. The drawstring 14 has attachment points for attaching the container to an immovable object such as a wall, a floor, a ground surface or a large object inside a door and/or letterbox. The opening 15 and the container 13 are arranged to prevent ingress of moisture or dust (by hanging the container upside down), thereby protecting a delivery that is placed into the container 13.

The flexible container 13 further comprises a display 16 for displaying a code, a solar collector 17 for charging a battery (not shown), a lock 18, an opening lock or button 19 and a key 20. The lock 18 allows the drawstring 14 to be opened in two stages; the first stage only opens the drawstring 14 by an amount sufficient to allow the recipient of the delivery to see the contents of the container 13. The second stage fully loosens the drawstring 14, allowing the recipient to remove the contents of the container 13 if they are satisfied with the delivery.

The two-stage opening of the drawstring 14 can be thought of as equivalent of the two stage opening of the box 1. In the first stage of opening the flexible container, the recipient cannot remove the contents of the container 13. Similarly, when a recipient opens the outer door 2 of the box, they cannot remove the contents of the box 1. In the second stage of opening the flexible container 13 the recipient may remove the goods from the container 13. Similarly, in the second stage of opening the box (opening the transparent inner door 3), the recipient can remove the contents of the box 1.

Referring to FIG. 5, there are illustrated possible delivery scenarios for both embodiments of the invention. If the container is not left on the latch or a delivery has already been made, then the parcel cannot be delivered. If this is a regular occurrence, then the recipient may consider obtaining a further container. Other delivery scenarios are described below:

Where the container is left closed but not locked by the recipient, the carrier places the parcel in the container. The container is locked and a code is issued. The carrier puts a slip containing the delivery details and the code through the recipient's letterbox. The recipient, on returning, checks the code on the slip against the code on the container, and checks the contents of the delivery through the window 3/opening 11. If the recipient is satisfied with the delivery, they unlock the container to accept the delivery.

Where the container is left closed but not locked by the recipient, the carrier places the parcel in the container. A delivery code is generated which the carrier keeps, but the carrier does not provide this code to the recipient. However, the recipient can obtain the code from the container, and if, on inspecting the contents of the container through the window 3/opening 11, prior to unlocking the container $2^{nd}$ stage, the recipient is not prepared to accept the delivery, the codes held by the recipient and the carrier can be matched to prove delivery.

Where the container is left closed but not locked by the recipient, the parcel is placed in the container. The container is locked and a code is issued. The carrier puts a slip containing the delivery details and the code through the recipient's letterbox. The recipient, on returning, checks the code on the slip against the code on the container, and checks the contents of the delivery through the window 3/opening 11. If, on inspecting the delivery, the recipient is not satisfied, then they contact the carrier. By not opening the box, the recipient has not accepted delivery, and by checking the codes held by the recipient and the carrier, the carrier can beyond doubt establish that the parcel was delivered by them.

If the carrier merely attempts to record the code without making a delivery, the recipient does not unlock the container $2^{nd}$ stage and contacts the carrier to inform them that a delivery was registered but not made. If the carrier doubts the recipients word, the carrier can check the contents of the container themselves before the container second stage is unlocked, and also check the matching codes held by the recipient and the carrier.

If a carrier attempts to falsify a code, the codes held by the carrier can be checked against a database of codes held by the container manufacturer.

If a recipient accepts a delivery from the carrier, they will need to unlock the container to remove the parcel. This resets the random number generator. If the recipient then attempts to claim that the parcel was not delivered, the carrier can check the code on the container against the code they received when the delivery was made. If the two codes differ, then the carrier knows that the box has been unlocked since the delivery was made, and so the parcel has been removed.

Figure 6:
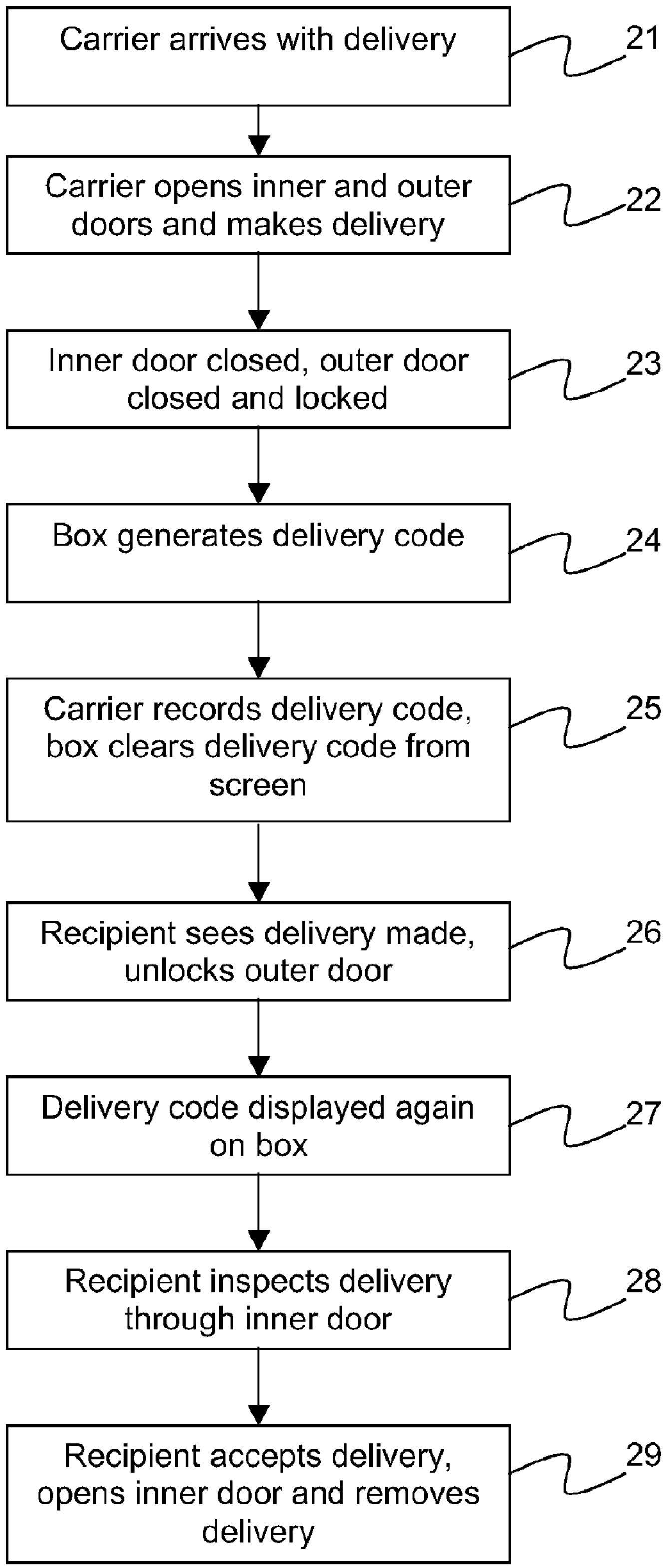
FIG. 6 is a flow diagram showing the steps of a typical delivery.

Referring to FIG. 6, the steps of a typical delivery are shown. These are illustrated as though the recipient was using the delivery box 1 of the first-described embodiment, but also apply to the flexible container 13 of the second embodiment.

When a carrier arrives with 21 a delivery, the carrier opens 22 the inner and outer doors of the container, and places the delivery in the container. The inner door is closed, and the outer door is closed and locked 23, triggering the box to generate a delivery code 24. The delivery code is displayed for a short time and recorded 25 by the carrier. When the recipient returns to the box, he sees that a delivery has been made (for example, by the carrier posting a delivery advice note) and opens the outer door 26. This causes the delivery code to be displayed 27 once more. The recipient inspects 28 the contents of the box through the transparent inner door without opening the inner door. If there is a problem with the delivery, the recipient records the delivery code and contacts the carrier. If there is no problem, the recipient opens the inner door to accept 29 delivery In an alternative embodiment, the lock 6 and key 8 are replaced by a keypad operated lock with an unlock code that is known only to the recipient.

Alternatively, the lock could be activated by a magnetic card held by the recipient, or by an infrared or radio frequency signal. The unlock sequence is still a two part process, one action to view the 'delivery code' and contents and another to unlock the second stage of container 1. The mechanical lock may be favoured to minimise cost and power consumption, although other types of lock may be suited to particular applications.

The signalling that the container 1 is locked closed and that the code should be displayed could be carried out in a number of different ways; mechanical switches, magnetic switches, light dependent switches, key code switches, capacitance dependant switches, inductance dependant switches, resistance dependant switches, and sound dependant switches could all be used to activate the code generation. The mechanical switch may be favoured to minimise cost and power consumption, but other methods may be more secure.

In alternative embodiments, the code generated could be displayed in a number of ways; LCD or LED display, electronically displayed bar code. Alternatively, instead of displaying the code, the code may be printed on a slip or transmitted in a signal, for example infrared, Bluetooth, wireless LAN, sound, or text message. The simple LED or LCD display may be favoured to minimise power consumption and cost.

The delivery details may be provided to the recipient in a number of different ways; delivery slip, e-mail, text message, secure website database or phone message. A method other than delivery slip may be favoured when the letter box is not easily accessible or secure.

It is also possible to use the container 1 for collections instead of deliveries. In this case, the lock 6 and key 8 could be replaced by a keypad operated lock as described above. The code for the keypad that may be changed for each delivery could be given to the carrier when collection was arranged, along with the unique code that was generated when the container 1 was locked closed with the parcel or letter inside. On arriving to collect the parcel, the carrier could check the description, the code, the contents, no visible damage to the contents or no other problems, before deciding to collect the delivery.

It will be appreciated by the person of skill in the art that various modifications may be made to the above described embodiments without departing from the scope of the present invention. For example, the above embodiments have been described with reference to delivery and collection containers. However, the invention can be employed to other secure containers, for example ballot boxes and storage containers.

The invention claimed is:

1. A lockable container for receiving items, and further comprising:

means for generating a random code when an item is placed in the container, and means for transferring the code to a person placing the item in the container;

a memory for storing the code;

means for unlocking the container to a first stage, in which the contents of the container can be viewed by a user but not removed from the container;

means for transferring the code to the user when the container is unlocked at the first stage;

means for unlocking the container to a second stage, in which the user can remove the contents of the container and the code is removed from the memory.

2. A container as claimed in claim 1, wherein the container comprises:

an opaque outer door;

a transparent inner door;

wherein the first stage of unlocking allows the user to open the outer door; and the second stage of unlocking allows the user to open the inner door.

3. A container as claimed in claim 1, wherein the container comprises:

a flexible bag;

a drawstring around an opening to the flexible bag;

wherein the first stage of unlocking loosens the drawstring sufficiently to allow the user to view the contents of the flexible bag; and the second stage of unlocking further loosens the drawstring to allow the user to remove any contents of the flexible bag.

4. A container as claimed in claim 1 where the random code is a proof-of-delivery code.

5. A container as claimed in claim 1, wherein the means for transferring the code to a person locking the container is selected from any of:

a visual display readable by the user, the visual display arranged to display an alpha-numeric code or a bar code;

a radio frequency signal;

an infra-red signal; and a sound signal.

6. A container as claimed in claim 1, wherein the means for transferring the code to a person locking the container is selected from any of a visual display readable by the user, the visual display arranged to display an alpha-numeric code or a bar code; a radio frequency signal; an infra-red signal; and a sound signal, and wherein the transferring means is active for a predetermined period of time.

7. A container as claimed in claim 1, wherein the means for transferring the code to a person locking the container is selected from any of a visual display readable by the user, the visual display arranged to display an alpha-numeric code or a bar code; a radio frequency signal; an infra-red signal; and a sound signal, and the container further comprising means to re-transfer the code.

8. A container as claimed in claim 1, wherein the generated code further comprises values selected from a serial number unique to the container; a date stamp; and a time stamp.

9. A container as claimed in claim 1, wherein the code is encrypted.

10. A container as claimed in claim 1, comprising a lock, wherein the lock is selected from one of a lock and key; an electronic keypad; an infrared receiver; a radio frequency receiver; a magnetic card reader; and a sound receiver.

11. A container as claimed in claim 1, comprising a lock, wherein the lock is selected from one of a lock and key; an electronic keypad; an infrared receiver; a radio frequency receiver; a magnetic card reader; and a sound receiver, the container further comprising further means to activate a lock.

* * * * *

UNITED STATES PATENT AND TRADEMARK OFFICE

CERTIFICATE OF CORRECTION

PATENT NO. : 8,358,199 B2
APPLICATION NO. : 12/514843
DATED : January 22, 2013
INVENTOR(S) : Andrew Edward Nesling It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 920 days.

Signed and Sealed this
First Day of September, 2015

Michelle K. Lee
*Director of the United States Patent and Trademark Office*